July 7, 1959   C. R. JUDD   2,893,343
PNEUMATIC TIRE ACCESSORIES
Filed Nov. 29, 1956

INVENTOR.
Charles R. Judd
BY
ATTORNEY

United States Patent Office 2,893,343
Patented July 7, 1959

2,893,343

PNEUMATIC TIRE ACCESSORIES

Charles R. Judd, Denver, Colo.

Application November 29, 1956, Serial No. 625,025

2 Claims. (Cl. 116—34)

This invention relates to attachments operable in mounted association with conventional valve assemblies of pneumatic tires to automatically signal reduction of the pressure obtaining within the tire, and has an object to provide a novel and improved such attachment characterized by facility of installation and use, economy of production, dependability of operation, and simplicity of adjustment throughout an operative range adequate to meet the requirements of diverse specific applications.

A further object of the invention is to provide a novel and improved attachment adapted for operable association with pneumatic tires to signal a reduction of the inflation pressure in modern tires of so-called "low-pressure" type.

A further object of the invention is to provide a novel and improved attachment operable in association with pneumatic tires to signal a reduction of pressure therein which is expediently adjustable to signal moderate decreases in the inflation pressure of the associated tire.

A further object of the invention is to provide a novel and improved attachment automatically operable to signal reductions in the inflation pressure of an associated tire and to conserve a proportion of the tire inflation subsequent to the signal.

A further object of the invention is to provide a novel and improved construction and unitary operative organization of elements constituting an attachment automatically operable to signal the reduction of inflation pressure obtaining in an associated pneumatic tire.

A further object of the invention is to provide a novel and improved attachment automatically operable to signal reduction in the inflation pressure of an associated tire that is simple and economical of production from available materials in a variety of structural embodiments, and that is durable and operatively dependable throughout long periods of time.

With the foregoing and other objects in view, my invention consists in the construction, arrangement, and operative combination of elements as hereinafter set forth, pointed out in my claims, and illustrated by the accompanying drawing, in which Figure 1 is a section longitudinally and axially through a typical embodiment of the invention as installed in position of practical use.

Figure 1:
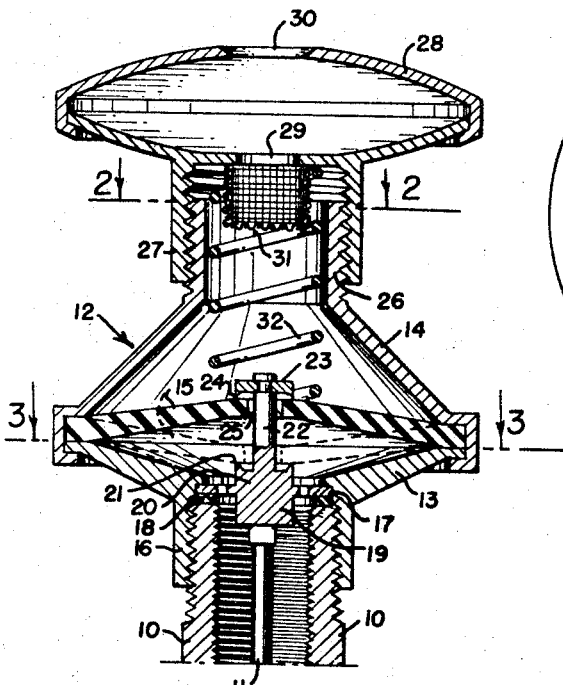
Figure 2:
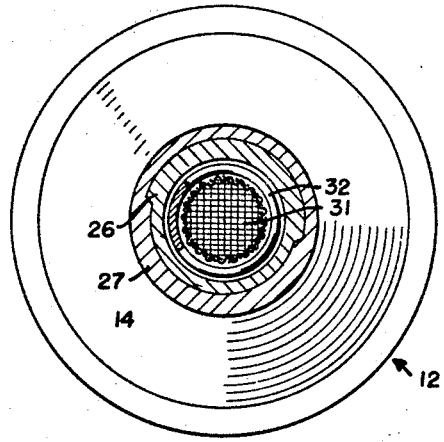
Figure 2 is a section transversely through and substantially on the indicated line 2—2 of Figure 1.
Figure 3:
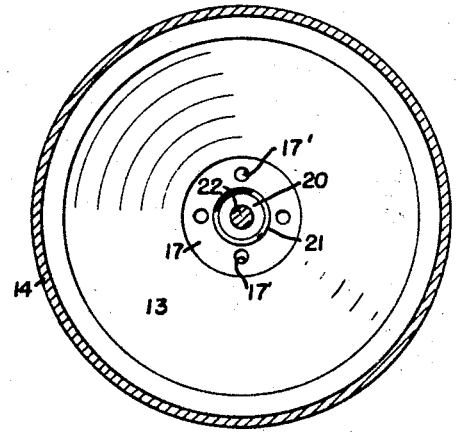
Fig. 3 is a section transversely through and substantially on the indicated line 3—3 of Figure 1.

The importance of directing attention to reduction of inflation pressure in pneumatic tires has long been recognized, and an extensive variety of devices designed to indicate such pressure reduction has heretofore been devised. Such of the known devices as provide a visual signal at the tire are manifestly inadequate to give warning of pressure reduction during translation of the vehicle equipped with the tire, and others of such devices operable to provide an audible signal are ill-adapted to function at the moderate pressures characterizing modern tire practice and have proved to be less than satisfactory in other respects, hence the instant invention is directed to the provision of a novel and improved such device free from the shortcomings above noted and operable under the conditions currently obtaining to signal moderate decrements of tire inflation in a manner to register audibly.

Inflation and deflation of pneumatic tires is conventionally accomplished and controlled through a valve unit well standardized in the form of an externally-threaded tubular stem 10 operatively housing a valve core finger 11 terminating inwardly adjacent the free end of the stem 10 in a maximum extension outwardly of the stem when the valve is seated to retain pressure within the associated tire; retraction of the finger 11 inwardly of the stem serving to open the valve for escape of inflation pressure outwardly of the stem 10 therethrough. The free end of the stem 10 is customarily closed by a cap threadedly cooperating therewith, in which usual conditions of the valve assembly there is no provision for any check of the inflation pressure controlled through the valve save by removal of the cap and application of a testing gage reactive to the inflation pressure when the finger 11 is retracted to open the valve. The improvement of the instant invention is adapted to seat on the free end of the stem 10 as a substitute for the conventional cap in threaded coaction with the stem end and to remain in such operative association with the conventional valve assembly where it functions to generate a warning signal in reaction to reduction of the inflation pressure controlled by the valve assembly.

In a unitary assembly, the improved attachment includes a double frusto-conical, hollow housing 12 constituted from complementary members 13 and 14 formed from any suitable rigid material in any expedient manner and assembled with their major base areas intercoupled in clamped engagement with the periphery of a flexible diaphragm 15 thereby disposed diametrically of and in obstructing relation across the housing 12 at the meeting plane of the members 13 and 14. The member 13 is preferably developed as the frustum of a cone of low altitude in proportion to its base and hence presents a rather shallow cavity at one side of the diaphragm 15 and said member is formed with a coaxial, interiorly-threaded sleeve 16 projecting exteriorly therefrom in a size adapted for threaded coaction with the free end of the stem 10. The bore of the sleeve 16 opens entirely through the member 13 and is shouldered adjacent its inner end to receive and position a perforated disc element 17 of a fitting distinctively characterizing the improvement, which disc and associated fitting is clamped to the positioning shoulder and firmly held within the sleeve 16 when the member 13 is screwed to a firm seat on the free end of the stem 10 to compress a sealing gasket 18 interposed between said stem end and the disc 17. The fitting characterized by the disc 17 includes a boss 19 fixedly outstanding centrally from said disc at the same side of the latter as the sleeve 16, which boss 19 is adapted to bear against the free end of the finger 11 and open the valve passage through the stem 10 when the member 13 is firmly seated on said stem, and a similar boss 20 outstands centrally from the disc 17 at the side of the latter remote from the boss 19 to terminate within the cavity defined by the member 13 as an annular, acute-margined valve element 21 defining a plane parallel to and spaced slightly from the plane marking the junction of the members 13 and 14. The diaphragm 15 is formed with a circular central aperture of a diameter less than that of the valve element 21 and a post 22 fixedly extends coaxially from the boss 20 through the aperture in the diaphragm 15 to rminate within the cavity 14 and therein fixedly support plate 23 carrying an annular valve element 24 comementary to, in spaced opposition with, and at the side the diaphragm 15 remote from the valve element 21, hich valve element 24 is parallel to and spaced a stance greater than the thickness of the diaphragm 15 om the plane marking the junction of the members 13 id 14. The fitting characterized by the disc 17 thus cludes the bosses 19 and 20, the post 22, the plate ), and the valve elements 21 and 24 in a fixed disposi- on such as to extend the post loosely through the aphragm with the elements 21 and 24 spaced from and t the opposite sides of said diaphragm, whereby to provide that pressure released through shift of the finger . by means of the boss 19 may pass freely through the ıles 17' of the disc 17 and to the interior of the cavity aracterizing the member 13, within which cavity the essure operates against a large exposed area of the aphragm 15 to flex the latter outwardly away from the e end of the stem 10 and into sealing engagement with e valve element 24 effective to trap the pressure within e cavity of the member 13 and inhibit pressure escape rough the annular zone 25 established by the spacing the central opening of said diaphragm from and about ; post 22.

The member 14 convergently tapers from its junction th the member 13 to a coaxial, tubular, terminal collar which is externally threaded for coaction with a com- :mentary tubular socket 27 outstanding centrally from e side of a preferably-lenticular, hollow housing unit organized to generate a wave signal in reaction to :ssure flow of fluid therethrough. The collar 26 is lly open throughout its length to accommodate free ssage of air from the interior of the member 14 and ; housing unit 28 is formed with a central aperture intersecting the base of the socket 27 in appropriate ;istration with an opposed outlet 30 in the side of d unit remote from said socket, and a cup-shaped een 31 preferably surrounds the aperture 29 within : socket 27 to inhibit introduction of foreign matter ough the openings 29 and 30 to the interior of the mber 14. As represented by Figure 1, the housing it 28 and its openings 29 and 30 are organized to ction in a conventional manner for the generation an audible signal, such as a whistle, when subjected outward flow of air from the interior of the associd member 14, thus to direct attention to escape of air m the associated tire through the assembly mounted on the tire valve stem 10. Completing the organiza- n of the improvement, an expansive coil spring 32 appropriate stiffness operatively engages between the ie of the socket 27 and the central area of the dia- :agm 15 exposed to the interior of the member 14, ereby to apply the pressure of said spring axially of member 14 and collar 26 to the flexible area of the phragm in a manner to urge the latter toward a seat Linst the valve element 21, as indicated by broken :s in Figure 1. As should be obvious, the threaded ;agement of the housing unit 28 with the collar 26 the member 14 provides means for adjustably varying pressure transmitted by the spring 32 to the dia- agm 15, thus to selectively vary the flexing of the phragm in reaction to air pressure acting thereupon. Constructed and organized as shown and described, :allation and operation of the improvement should be dily apparent from the foregoing. With the attach- nt separated from the conventional tire valve stem the tire is inflated in a usual manner and to a pre- ed interior pressure which is initially retained by conventional valve assembly represented by the ;er 11. Subsequent to inflation of the tire, the at- iment assembly is threadedly engaged with the free of the stem 10 and rotated to a secure seat there- n, which action results in shift of the valve ;er 11 to open outflow from the tire through the stem with consequent delivery of air at the inflation pressure of the tire through the holes 17' of the plate 17 and to the interior of the member 13. The air under pressure accumulates interiorly of the number 13 whence it may escape only through the annular passage 25 interrupting the diaphragm about the stem 22, and as so confined the air applies its pressure to the diaphragm 15 in a manner to flex the latter against the pressure of the spring 32 and to a seating of the diaphragm against the valve element 24 such as closes any passage for escape of the air from between the member 13 and diaphragm 15, all as represented by full lines in Figure 1. As long as the air pressure acting against the diaphragm 15 from the interior of the tire is sufficient to hold the diaphragm to the valve element 24 against the pressure of the spring 32 in a normal operating relation of the elements represented by the full lines of Figure 1, no signal is generated, such optimum condition being selectively established in appropriate correlation with a given tire pressure through adjustment of the housing unit 28 axially with respect to the member 14 in a manner and to a degree such as to permit the spring 32 to unseat the diaphragm 15 from the valve element 24 upon slight decrease of the tire inflation pressure. When, for any reason, there is a decrease of the tire inflation pressure, the spring 32 acts to unseat the diaphragm 15 from the valve element 24 and thereby to open a passage for outflow of air through the annular space 25 about the stem 22 and past the valve element 24 to the interior of the member 14 and thence outwardly through the housing unit 28 where such flow generates the wave signal characteristic of the unit. The signal so generated continues as the tire inflation is further reduced as a consequence of outflow through the improvement and until such reduction of the inflation pressure permits the spring 32 to flex the diaphragm 15 into seating engagement against the valve element 21, as shown by broken lines in Figure 1, whereupon escape of air from the tire through the improvement is arrested and the signal ceases. Duration of the signal is a function of the size of the annular space 25 through the diaphragm 15 about the post 22, it being fully obvious that the size of such space will determine the time period during which air flow continues to and through the housing unit 28 after the seal at the valve element 24 is broken and before the seal of the diaphragm against the valve element 21 is established.

Since changes, variations, and modifications in the form, construction, and arrangement of the elements shown and described may be had without departing from the spirit of my invention, I wish to be limited solely by the scope of the appended claims, rather than by any details of the illustrative showing and foregoing description.

I claim as my invention:

1. A pneumatic tire accessory automatically operable to signal reduction of adjustably-determined tire inflation pressures, comprising a hollow housing formed with coaxial, oppositely-directed open ends whereof one is externally threaded and the other is internally threaded for connection with the free end of a conventional tire inflation valve stem whereby to mount said housing on and as a flow passage continuing extension of the latter, said internally-threaded housing end being formed with an annular, interior shoulder at the inner end of its threaded portion, a perforated disc marginally engaging said shoulder transversely of the internally-threaded housing end, a boss centrally of said disc offset therefrom axially and outwardly of the internally-threaded housing end positioned for depressing engagement with and to hold open the conventional tire inflation valve of a stem with which the housing is connected, whereby to apply tire inflation pressure interiorly of the mounted housing, a post centrally of said disc fixedly projecting therefrom interiorly of the housing in opposition to said boss, a pair of complementary, annular valve seat elements spacedly circumscribing said post in spaced opposition axially thereof, a flexible, centrally-apertured diaphragm loosely embracing said post between said valve seat elements fixed marginally to and transversely of said housing for alternative sealing coaction with said valve seat elements as an incident of its flexure, a whistle generative of an audible signal in response to air flow therethrough threadedly mounted upon and for adjustment axially along the externally-threaded housing end, and an expansive coil spring within said housing and externally-threaded end thereof in end-bearing engagement between said whistle and the zone of said diaphragm embracing said post, whereby to resiliently and adjustably urge the diaphragm to sealing coaction with the valve seat element more nearly adjacent said perforated disc.

2. The organization according to claim 1, wherein said housing is of double frusto-conical form oppositely and axially convergent from a major diameter junction closing peripherally about said diaphragm to aligned open ends of small diameter respectively coactable with the valve stem and with the whistle, whereby to provide a relatively-extensive diaphragm area subject to inflation pressures received interiorly of the housing.

References Cited in the file of this patent

UNITED STATES PATENTS

| | | |
|---|---|---|
| 1,662,968 | Garrett | Mar. 20, 1928 |
| 1,756,273 | Wynkoop | Apr. 29, 1930 |
| 2,136,038 | Bourdon | Nov. 8, 1938 |
| 2,193,841 | Renner | Mar. 19, 1940 |
| 2,225,674 | West | Dec. 24, 1940 |
| 2,250,077 | Henry | July 22, 1941 |